United States Patent [19]

Nilsson

[11] Patent Number: 4,493,133
[45] Date of Patent: Jan. 15, 1985

[54] LOCKING MEANS, PARTICULARLY FOR TRUCK PLATFORM FLAPS, AND THE LIKE

[75] Inventor: Weimar Nilsson, Karsnäs, S-561 90 Huskvarna, Sweden

[73] Assignee: Huskvarna Transtortkonstruktionar A.B., Huskvarna, Sweden

[21] Appl. No.: 464,577

[22] Filed: Feb. 7, 1983

[30] Foreign Application Priority Data

Feb. 15, 1982 [SE] Sweden .............................. 8200901

[51] Int. Cl.³ ............................................ E05C 19/14
[52] U.S. Cl. ................................ 24/68 T; 24/68 CD; 24/69 CT; 24/71 T; 24/499; 292/247
[58] Field of Search .............. 24/69 CT, 69 ST, 68 A, 24/68 T, 68 CD, 71 T, 510, 523, 524, 517, 498, 499, 506, 501; 292/247, 113, 205, 104, DIG. 49

[56] References Cited

U.S. PATENT DOCUMENTS

| | | | |
|---|---|---|---|
| 1,250,326 | 12/1917 | Kyle ..................................... | 292/247 |
| 1,411,824 | 4/1922 | Wepplo ................................ | 292/205 |
| 2,140,594 | 12/1938 | Placco .................................. | 24/507 |
| 2,435,640 | 2/1948 | Taylor .................................. | 292/247 |
| 2,635,910 | 4/1953 | Celeste ................................. | 292/247 |
| 2,704,218 | 3/1955 | Claud-Mantle ..................... | 292/247 |
| 3,026,133 | 3/1962 | Swanson ............................. | 292/247 |
| 3,297,348 | 1/1967 | Griffiths et al. .................... | 292/113 |
| 3,534,992 | 10/1970 | Swanson ............................. | 292/113 |
| 4,218,081 | 8/1980 | Johnson ..................... | 292/DIG. 49 |
| 4,428,608 | 1/1984 | Cooke et al. ....................... | 292/247 |

FOREIGN PATENT DOCUMENTS 70346 7/1947 Denmark ............................ 292/247

Primary Examiner—Victor N. Sakran

[57] ABSTRACT

Locking means for truck platform flaps (6) comprises a base plate (1), a handle (2) pivotably journalled in the base plate, a substantially U-shaped locking yoke (3) which is connected to the handle and pivotable in relation thereto on an axis substantially parallel to the pivot axis of the handle and which in its locking position is adapted to engage a hook (11) for holding the flap, and at least one spring (24) which actuates the handle and the locking yoke and whose one end is secured to the base plate (1). To make one and the same spring fulfill three essential functions, viz. ensuring resilient appliance of the locking yoke (3), rotation of the handle in the direction towards the base plate (1) at locked as well as unlocked (when the handle has an opening angle which is not substantially more than about 50°) flap locking means, and maintenance of the handle in locking position as well as in its fully open position, the other end of the spring (24) is secured in the handle (2) or in an appurtenant member (22) rigidly connected thereto at a point (25) which is so located, that the spring on one hand strives to rotate the handle in the direction towards its locking position when the handle is turned out from the base plate and is positioned on one side of a dead center position, and on the other hand strives to rotate the handle in the direction towards its open position when the handle is turned out from the base plate and is positioned on the other side of said dead center position. (FIG. 7)

9 Claims, 8 Drawing Figures

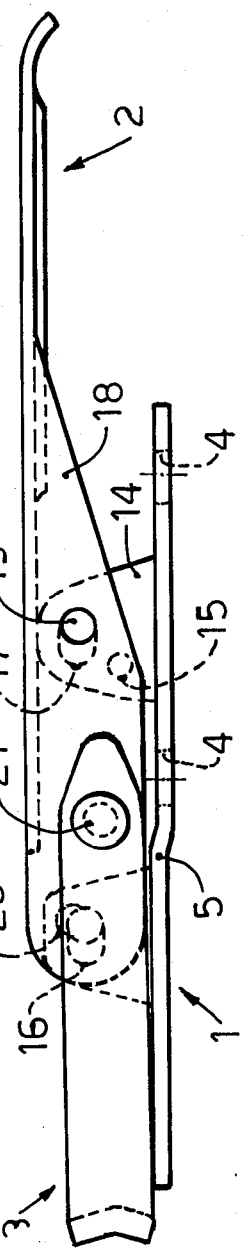
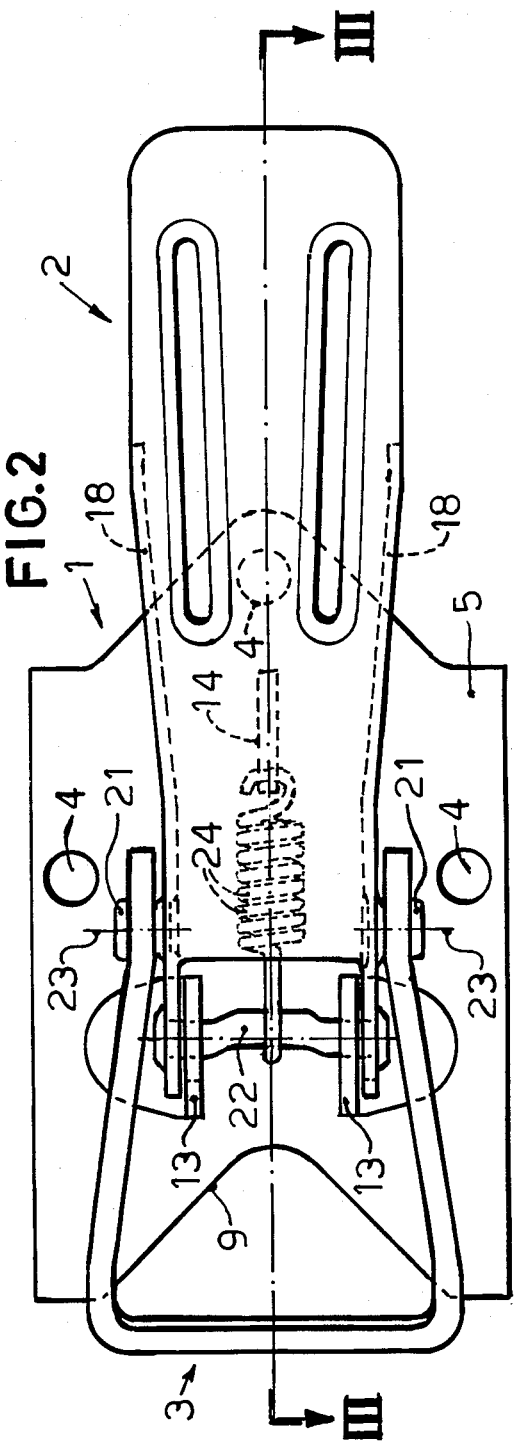

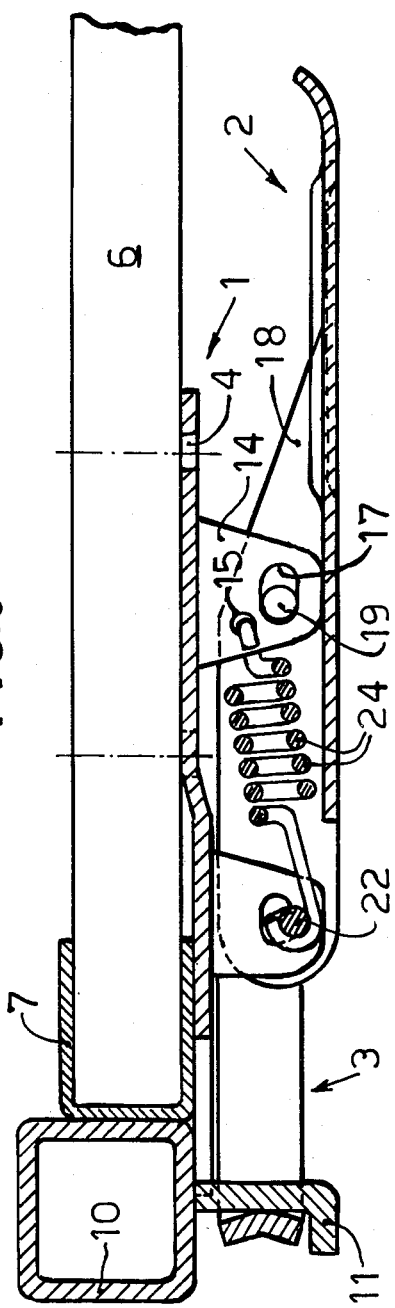
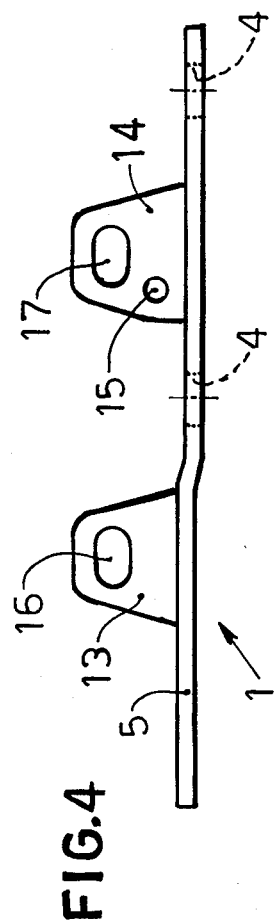
FIG.3
FIG.4

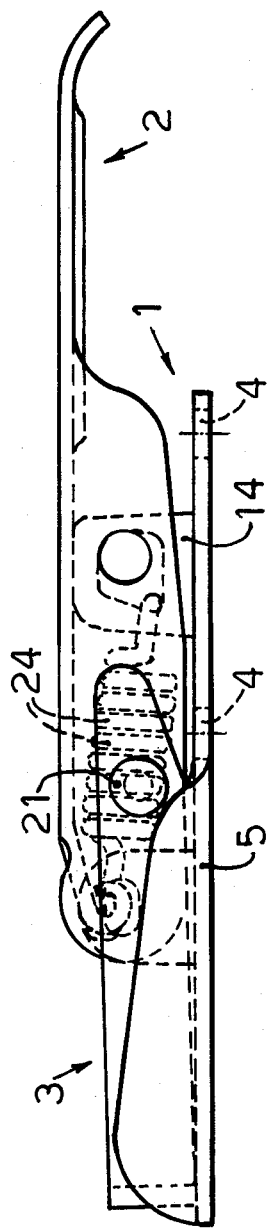
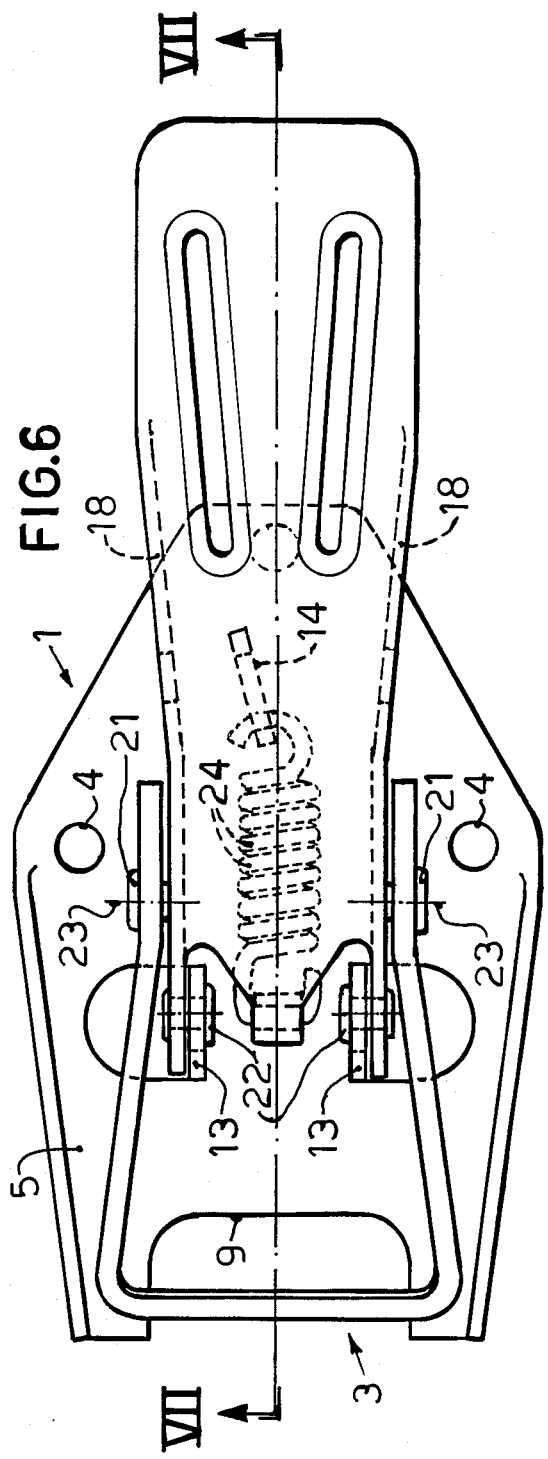

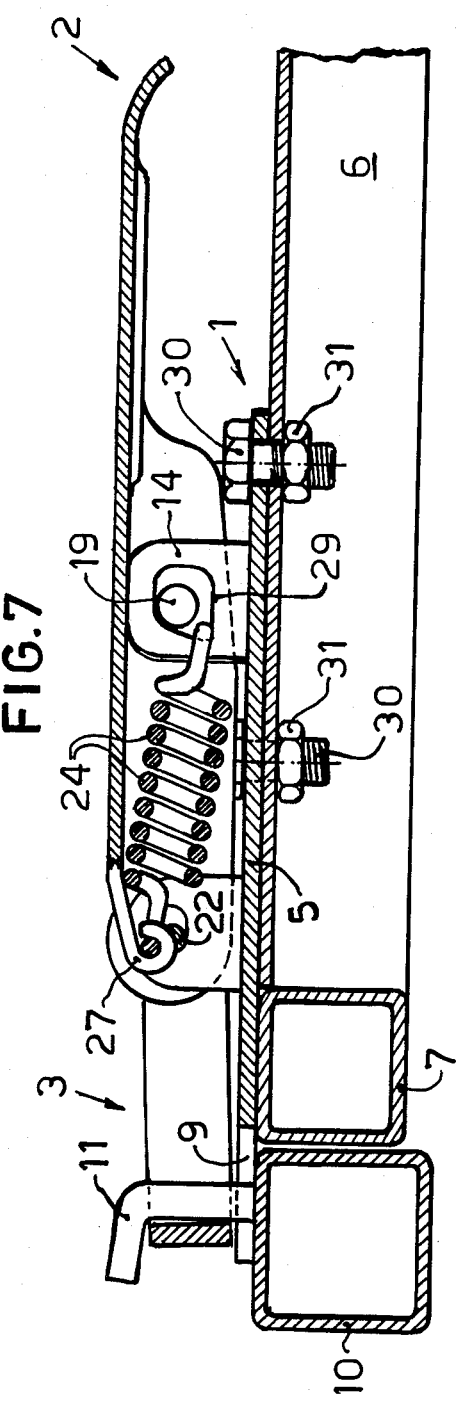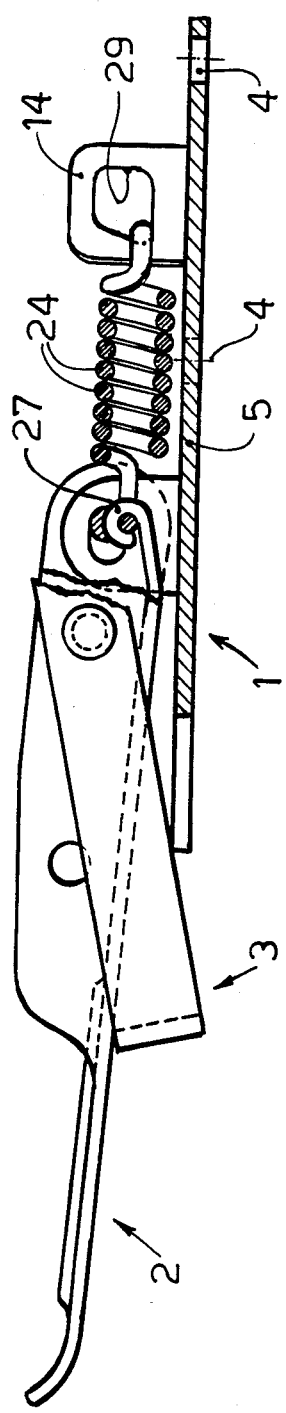

LOCKING MEANS, PARTICULARLY FOR TRUCK PLATFORM FLAPS, AND THE LIKE

BACKGROUND OF THE INVENTION

This invention relates to a locking means and especially for locking means for truck platform flaps.

In trucks having a load platform and flaps the load often gives rise to a considerable pressure from the inside against the flap, which entails the disadvantage that the appurtenant flap lock tends to become unintentionally opened. In locks of the prior art one has basically chosen between two ways when solving this problem. In cheaper locks a spring-loaded latch is utilized which maintains a locking handle in locking position. The handle may be freed by manual turning of the lock out of engagement, but this requires a considerable finger strength. It involves considerable difficulties to open the lock, particularly if it is subjected to a load on account of the pressure from the load against the flap. Another disadvantage of this known device resides therein that projecting parts of the lock may wear a tarpaulin or the like which convers the load platform to which the flap belongs. In addition hereto the projecting parts increase the effective dimensions of the load platform. In open position the handle often projects perpendicularly from the flap and the base plate and may then easily hit and damage a rear lamp or another fragile object when the flap is turned down.

The other way of solving the above problem has been to provide the lock with a latch bolt or slide which is displaceably mounted on the plate and forms a supplement to the locking yoke and in which the handle is pivoted. The handle is actuated in the direction towards its locking position by a torsion spring whose one end engages the handle and whose other end engages the latch bolt which in its locking position engages a U-shaped hook. The yoke is actuated in the direction towards its locking position (i.e. in the direction away from the free end of the handle when it occupies its locking position) by two compression springs which are mounted countersunk in the slide between a slide end wall and a pair of hooks provided on the base plate. A disadvantage of this solution is that the lock becomes rather complicated and comparatively expensive. Another drawback, of this solution is that the latch bolt tends to get stuck in its locking position through friction and possible pressure against the lock.

SUMMARY OF THE INVENTION

The principal object of the invention is to solve the above problem and to provide locking means of the above kind which is free from the enumerated disadvantages.

In accordance with the present invention, one and the same spring fulfils three desirable functions, viz., 1. brings about resilient appliance of the locking yoke;
2. maintains the handle in its locking position and also in a fully open position after opening or turning of the handle (more than about 90° from its locking position);
3. turns the handle toward the base plate as well when the flap lock is locked as when it is unlocked (when the handle has an opening angle less than about 50°). Through the spring force pressing the handle against the base plate also an unintentional opening of the lock is obviously prevented.

Above and in the following the expression "locking position" (of the handle) means the position occupied by the handle when the flap lock is locked, the locking yoke is in engagement with its hook and the handle rests against the plate. "Unlocked position" means all positions but the locking position. In its "open position" (which is a special case of unlocked position) the handle is rotated almost 180° from its locking position.

BRIEF DESCRIPTION OF THE DRAWINGS

Further features and advantages of the locking means according to the invention will become apparent from the following detailed description and the annexed drawings which diagrammatically and as non-limiting examples illustrate some preferred embodiments of the invention.

FIG. 1 is a side view of a locking means according to a first embodiment of the invention.

FIG. 2 is a plan view corresponding to FIG. 1.

FIG. 3 is a longitudinal sectional view on line III—III in FIG. 2 and also illustrates a corner post with a hook in which the locking yoke of the locking means is in engagement in the locking position of the device.

FIG. 4 is a side view of a base or attachment plate comprised in the locking means according to FIG. 1.

FIGS. 5 and 6 illustrate a second embodiment of the locking means in the same way as FIGS. 1 and 2, respectively.

FIG. 7 is a longitudinal sectional view on line VII—VII in FIG. 6 and also illustrates a corner post having a hook with which the locking means is in engagement in the locking position of the device.

FIG. 8 is a side view, partly in section, showing the flap lock in its open position.

DESCRIPTION OF THE PREFERRED EMBODIMENTS

The principal parts of the locking means in accordance with the invention are a base or attachment plate 1, an one-armed lever 2 and a substantially U-shaped pivot or locking yoke 3. The base plate 1, which is shown separately in FIG. 4 and by means of which the locking means is intended to be secured to a flap of a truck platform, a trailer or the like has for this purpose three screw holes 4. These are provided in a plate 5 which comprises two substantially plane and mutually parallel-displaced portions, of which one which is located under the locking yoke 3 is situated on a somewhat higher level than the other one, as is most clearly evident from FIGS. 1 and 4 to provide space for an edge reinforcement 7 belonging to the flap 6 (FIG. 3). The left-hand end of the base plate in FIG. 2 is considerably extended to provide a support for the shanks of the locking yoke 3 and has a substantially triangular recess 9 to provide space for a hook 11 which is preferably welded to a corner post 10 (FIG. 3) and with which the locking yoke 3 is intended to cooperate. In this embodiment the right-hand end of the base plate 1 in FIGS. 1–4 is designed in a complementary way with respect to the left-hand end, i.e. has a projecting apex whose contour is in agreement with that of the recess 9 to minimize the waste when a succession of base plates are punched out of a band.

The base plate 1 has three ears which project from the plate 5 and of which two constitute a pair of bearing ears 13 for the handle 2 and the third ear constitutes a spring bracket 14 which for this purpose is provided with a bore 15. Each of the bearing ears 13 (see particularly FIG. 4) has an aperture 16, said apertures registering with each other and defining a pivot axis for the handle 2. These apertures are longish for reasons which will appear from the following. Also the spring bracket 14 has a longish aperture 17, the purpose of which will also become apparent from the following.

The ears 13, 14 may either be welded to the plate 1 or punched out and bent out thereof.

As is illustrated in the Figures, the handles 2 has two lateral walls 18 which are bent out substantially perpendicularly to the intermediate main portion of the handle, whereby the handle becomes substantially U-shaped as seen in an end view. In each one of these lateral walls 18 an aperture 19 (FIGS. 1 and 2) is provided. The apertures 19 are mutually coaxial and register with the aperture 17 in the ear 14. The apertures 17, 19 permit securing of the handle 2 in its locking position, e.g. by means of a peg or a padlock which is threaded through them.

In the handle 2 the U-shaped locking yoke 3 is pivotally journaled by means of a pair of mutually coaxial bearing studs 21 with respect to the ear 14, by means of a shaft 22 (FIG. 2). In accordance with the invention the shaft 22, which is rigidly united with the handle 2 and accordingly can be regarded as a portion thereof in the embodiment illustrated in FIGS. 1-4, is basically shaped as a crank having a central portion which is parallel-displaced with respect to the geometrical pivot axis 23 of the handle 2 (FIG 2.). This geometrical axis constitutes a centre axis of the mutually coaxial ends of the mechanical pivot shaft 22 which penetrate the apertures 16.

In the aperture 15 of the ear 14 one end of a tension coil spring 24 is secured which is diagrammatically indicated FIG. 2 and is most clearly shown in FIG. 3 but has been omitted in FIG. 1 to avoid complication of this Figure. According to the invention the other end of the spring 24 is secured to the parallel-displaced central portion of the shaft 22 in such a manner that the torque arm with respect to the geometrical pivot axis 23 of the tensional force of the spring 24 actuating the handle 2 becomes maximum in or near the position occupied by the handle in its locking position. The diagrammatically indicated attachment point of the other end of the spring 24 corresponding to the aperture 15 is indicated by 25 in FIG. 1. Through this design the spring 24 actuates the handle by a torque which tends to maintain the handle in its locking position and accordingly prevents or counter-acts unintentional opening of the handle 2.

The spring 24 exerts this torque which is directed clockwise in FIG. 1 and counter-clockwise in FIG. 3 upon the handle 2 until the latter has become turned out to a dead center position in which it forms an angle of about 90° with the base plate 1, and the geometrical axis of rotation 23 is positioned on the connection line between the points of attachment 15 and 25 of the spring 24.

Thanks to the design of the locking means in accordance with the invention described above the spring 24 also accomplishes another function which is most clearly evident from FIG. 3, in that the spring 24 tends to pull the pivot shaft 22 and accordingly also the locking yoke 3 to the right in the longish apertures 16 in FIGS. 1-3 and hereby makes the engagement between the locking yoke 3 and the hook 11 (FIG. 3) resilient. This results in a play-free locking of the flap and compensates wear and allowance in the manufacture.

After the spring 2 has become rotated past said dead center position the spring exerts a torque which is directed in the opposite direction upon the handle. Through the construction described above the spring 24 consequently maintains the locking yoke 3 and the handle 2 automatically pressed against the base plate 1 in the fully open position of the locking means, in which the handle has been pivoted substantially 180° with respect to the position according to FIGS. 1–3.

The modified embodiment which is illustrated in FIGS. 5–7 in which the same reference characters as in FIGS. 1–4 have been utilized to designate the same or similar detail differs from the embodiment described above in several, more or less important respects.

First and most important the other (left) end of the spring 24 is now attached to a projecting portion of the handle 2. This portion has the shape of a tip which is bent to a loop or the like 27, as is most clearly shown in FIG. 7, instead of to the shaft 22. This spring end gets, however, substantially the same relative position as in FIGS. 1–3. The loop 27 may be replaced by a tubular sleeve or the like which is welded to the handle 2.

Secondly, the left-hand end of the plate 5 is extended to such an extent that the two projecting tips of the plate located on opposite sides of the recess 9 which is now substantially U-shaped support the two shanks of the U-shaped locking yoke 3 and in addition hereto the most proximate portions of the web between the shanks, in the locking position. Through this design the pressure inside the truck flap is transferred to the hook through the base plate and the web of the yoke without giving rise to a lever-like force which tends to open the lock unintentionally. This construction results in a considerably less complicated lock which is free from the disadvantages from which the locks of the prior art suffer.

Thirdly, the relative parallel-displacement of the two ends of the plate 5 has been omitted. Furthermore, a hollow profile with a square cross section has been substituted for the edge reinforcement 7. In addition hereto the attachment apertures 15 or the other end of the spring 24 and the locking aperture 17 in the ear 14 have been united into one single opening 29. In FIG. 7 there are also shown bolts 30 passing through the apertures 4, and nuts 30 cooperating with said bolts by means of which the lock is secured to the truck flap.

Thanks to the invention a novel flap has been provided which has the following advantages:

1. The lock is low and has no projecting part which can catch or damage covers or the like.
2. The lock can easily be locked or unlocked, even with soft woman's hands.
3. The lock has a resilient appliance of the locking yoke which compensates for wear and variations in the manufacture; rattling in the flaps is eliminated.
4. The handle and the yoke of the lock do not project outwards when the flap in turned down.
5. The lock fixes the flap in three directions, outwards and inwards and tightens flap and post.
6. The lock may be mounted on an even steel flap as well as on a plywood flap with an edge profile.
7. The lock may be secured by a padlock, e.g. a lock for trailer hoods.
8. The lock has a low weight to be suited for car trailers and the like.
9. The lock is well suited for mass production and has few parts.
10. The lock is more inexpensive in manufacture than other known, technically equivalent locks.

The embodiments described above and illustrated in the drawings are, of course, to be regarded merely as non-limiting examples and may as to their details be modified in several ways within the scope of the following claims. Thus, the spring 24 may be replaced by a pair of cooperating, more or less parallel tension springs or by one or more compression springs which are mounted in a suitable way on the other side of the shaft 22 with respect to the spring 24. Furthermore, the locking means may be utilized for the tightening or securing of other objects than flaps. In addition hereto new embodiments which are also within the scope of the inventive concept may be created by combining details which are taken from different ones of the exemplificatory embodiments described above, in a suitable manner.

What I claim is:

1. Locking means, particularly for a truck platform flap of the type which comprises a base plate, an one-armed lever pivotably journaled in said base plate and having the shape of a handle, a substantially U-shaped locking yoke which is connected to the handle and pivotable in relation thereto on an axis substantially parallel to the pivot axis of the handle between locking and unlocking positions, said locking yoke being adapted to engage a hook or a recess when in said locking position for holding the flap, and at least one spring for actuating the handle and the locking yoke, said spring having one end operatively secured to the base plate and the other end operatively secured to said handle to a point which is located so that the spring on one hand urges said handle to rotate in the direction towards its locking position when the handle is turned out from the base plate and is positioned on one side of a dead center position, and on the other hand urges said handle to rotate in the direction towards its open position when the handle is turned out from the base plate and is positioned on the other side of said dead center position.

2. Locking means according to claim 1, wherein said spring is a tension spring.

3. locking means according to claim 1, wherein said handle comprises an eye portion which is located near the geometrical pivot axis of the pivotable handle when said handle is in said locking position and on the opposite side thereof with respect to said base plate when said handle is in said unlocking position, said point of operative connection of said other end of said spring with said handle being on said eye portion.

4. Locking means according to claim 1, wherein said pivotable handle comprises a mechanical pivot shaft which is shaped as a crank having a portion which is parallel-displaced with respect to the geometrical pivot axis of said pivotable handle, and wherein said point of operative connection of said spring to said pivotable handle is at said parallel-displaced portion of said mechanical pivot shaft, said parallel-displaced portion being located on the opposite side of said geometrical pivot axis of the handle with respect to said base plate in the locking position of the handle.

5. Locking means according to claim 1, wherein said handle in relation to said base plate is pivotable as well as displaceable in a direction with is substantially parallel to the longitudinal direction of the handle in its locking position.

6. Locking means according to claim 5, characterized by the provision of a pair of bearing ears projecting from said base plate and having a pair of longish apertures in which said mechanical pivot shaft of the handle is journaled.

7. Locking means according to any the preceding claims, characterized by the provision of an ear member projecting from said base plate and having a longish aperture in which said one end of the spring is secured, and a lateral side member belonging to the handle and having at least one aperture which registers with said longish aperture in said ear member in the locking position of the handle, a pad-lock being insertable through said registering apertures for maintaining the handle in its locking position.

8. Locking means according to claim 1, wherein said base plate has at least one tip or end which in the locking position is located just opposite and supportingly engages an area of the substantially U-shaped locking yoke which forms a transit between one of the U-shanks of the yoke and its central web portion located between the shanks.

9. Locking means, particularly for a truck platform flap of the type which comprises a base plate, an one-armed lever pivotably journaled in said base plate and having the shape of a handle, substantially U-shaped locking yoke which is connected to the handle and pivotable in relation thereto on an axis substantially parallel to the pivot axis of the handle and which in its locking position is adapted to engage a hook or a recess for holding the flap, and at least one spring which actuates the handle and the locking yoke and has one end which is operatively secured to the base plate, wherein said base plate has at least one end which in the locking position is located just opposite and supportingly engages an area of the substantially U-shaped locking yoke which forms a transit between one of the U-shanks of the yoke and its central web portion located between the shanks.

* * * * *